United States Patent

Baskett

[11] Patent Number: 5,074,586
[45] Date of Patent: Dec. 24, 1991

[54] ADJUSTABLE STEERING COLUMN MOUNTING ASSEMBLY

[75] Inventor: William C. Baskett, Maldon, England

[73] Assignee: Ford Motor Company, Dearborn, Mich.

[21] Appl. No.: 606,241

[22] Filed: Oct. 31, 1990

[51] Int. Cl.⁵ .............................................. B62D 1/18
[52] U.S. Cl. ...................................... 280/775; 74/493; 74/554
[58] Field of Search ...................... 280/775; 180/146; 74/493, 492, 554, 552

[56] References Cited

U.S. PATENT DOCUMENTS

| | | | |
|---|---|---|---|
| 3,302,478 | 2/1967 | Pauwels | 280/775 X |
| 3,412,629 | 11/1968 | Hill | 74/493 |
| 3,548,675 | 12/1970 | Crimes et al. | 74/493 |
| 3,628,396 | 12/1971 | Grobowski | 74/493 |
| 4,244,236 | 1/1981 | Sylvester | 74/493 |
| 4,273,005 | 6/1981 | Strutt | 74/492 |
| 4,463,625 | 8/1984 | Nishikawa | 280/775 X |
| 4,507,982 | 4/1985 | Turner et al. | 74/493 |
| 4,541,298 | 9/1985 | Strutt | 280/775 X |
| 4,554,843 | 11/1985 | Andersson | 280/775 X |
| 4,649,769 | 3/1987 | Venable | 74/493 |
| 4,656,888 | 4/1987 | Schmitz | 280/775 X |
| 4,657,281 | 4/1987 | Haldric et al. | 280/775 |
| 4,669,325 | 6/1987 | Nishikawa et al. | 74/493 X |
| 4,691,587 | 9/1987 | Farrand et al. | 280/775 X |
| 4,709,592 | 12/1987 | Anderson | 74/493 |
| 4,716,780 | 1/1988 | Nishikawa et al. | 74/493 |
| 4,753,121 | 6/1988 | Venable et al. | 280/775 X |
| 4,774,851 | 10/1988 | Iwanami et al. | 74/493 |
| 4,786,076 | 11/1988 | Wierschem | 280/777 |

Primary Examiner—Charles A. Marmor
Assistant Examiner—Kevin Hurley
Attorney, Agent, or Firm—Raymond L. Coppiellie; Roger L. May

[57] ABSTRACT

An adjustable steering column has a shaft in a casing both mounted on a beam which extends alongside the upper part of the shaft. The beam is secured to a bracket fixed to the vehicle structure and the beam remains parallel with the column throughout the range of adjustment of the column.

17 Claims, 2 Drawing Sheets

ADJUSTABLE STEERING COLUMN MOUNTING ASSEMBLY

BACKGROUND OF THE INVENTION

1. Field of the Invention

This invention relates generally to an adjustable steering column assembly for use in a motor vehicle. More particularly, the present invention relates to a mounting assembly for adjusting the reach and height of the steering column assembly.

2. Description of the Related Art

It is important that steering columns in motor vehicles be rigidly mounted in the vehicle to avoid the occurrence of vibration or resonance in the column. This can be done by making the column components relatively massive, but this is undesirable for a number of reasons. It is also necessary that the column be adapted for simple assembly into the vehicle on an assembly line.

A variety of adjustable steering column assemblies have been proposed to overcome the problems of vibration and resonance in the steering column. One such assembly is known from European Patent Application EP-A-0 050 999 in which a beam structure extends between the two column mounting points. In this assembly however, the position of the beam is fixed and the column moves relative to the beam when the column position is adjusted.

Great Britain patent No. 2,113,629 discloses a mounting assembly for an adjustable steering column wherein a support member on the steering column and a bracket member attached to the vehicle chassis includes a pair of slots extending generally at right angles to each other. The members are connected together by a pin passing through the slots of both members. In this manner, the steering column can be adjusted perpendicularly and parallel to the longitudinal axis of the steering column by loosening a clamping device found on the steering column. The clamping device comprises a sliding block mounted on a pin and a slot of either of the members. Clamping faces are formed on the sliding block and the other member.

Great Britain Patent No. 2,113,164 discloses another adjustable steering column mounting assembly having a support for rotatably carrying a steering column member and a bracket carrying the support. The support moves relative to the bracket in two mutually perpendicular directions. The mounting assembly further includes a clamping device for clamping the bracket to the support, characterized in that two rack and pinion sets are connected between the bracket and the support such that movement of the support relative to the bracket in each of the mutually perpendicular directions causes the pinions to roll relative to the racks of the respective rack and pinion sets. The clamping device increases the frictional forces opposing the relative movement of the rack and pinion.

It is an object of the present invention to provide an adjustable steering column mounting assembly in which a substantial proportion of the load typically carried by the steering shaft and surrounding casing are transferred to a beam secured to the vehicle chassis so that the steering shaft can be designed to optimize other requirements placed upon it.

It is an advantage of the present invention that only a single fastener need be released to enable both both the height and reach of the steering column to be adjusted. These and other features and advantages of the present invention will be disclosed in the following summary, drawings and detailed description of a preferred embodiment which follow.

SUMMARY OF THE INVENTION

According to the present invention there is provided an adjustable steering column mounting assembly for mounting a steering column assembly in an automotive vehicle body structure at two fixed, longitudinally spaced steering column mounting points, the steering column assembly having a steering shaft rotatably mounted in a tubular casing. The mounting assembly comprises a beam having a longitudinal axis generally parallel to a longitudinal axis of the steering shaft as well as means for securing the beam to the vehicle structure at the two mounting points so that the beam extends between the two mounting points and means for securing the tubular casing to the beam and to the vehicle structure so that the casing extends adjacent the beam. The means securing the casing to the beam allows the tubular casing and the beam to be adjusted relative to the mounting points so that the shaft, the casing and the beam maintain a substantially constant relative orientation. In one embodiment of the present invention, a first of the two mounting points may include a slotted aperture disposed on the means securing the beam to the vehicle body structure, the first mounting point allowing the beam and the steering shaft secured to the beam a limited amount of movement in a direction generally perpendicular to a longitudinal axis of the beam. The first mounting point also allows the tubular casing to slide axially with respect to the beam in a direction generally perpendicular to the longitudinal axis of the beam.

The beam of the present invention includes a track operative to engage the tubular casing and to allow the casing to slide axially therein in a direction generally parallel to the longitudinal axis of the steering shaft to adjust the axial length of the steering column assembly. The tubular casing of the steering column assembly further includes a guide flange axially disposed thereon and operative to engage the track of the beam and slide axially therein. The guide flange of the tubular casing includes a longitudinal groove extending thereon, the groove being adapted to receive a fastener therein so that the casing slides axially upon the fastener in the stated direction. This fastener is operative to adjust the steering column assembly in both a direction generally parallel to and a direction generally perpendicular to the longitudinal axis of the steering shaft.

The steering column mounting assembly according to the present invention further includes means for locking the steering column assembly in a desired position. The locking means includes a recessed portion disposed at the top end of the beam, the recessed portion including a linear cam wall having a first end which is separated a greater distance from the plane of the beam than is a second end of the cam wall. The locking means further includes a lever for engaging the cam wall so that movement of the lever from the second end of the cam wall to the first end of the cam wall locks the steering column assembly in the desired position. In the Preferred embodiment of the invention, the lever is interposed between a spacer adjacent the beam and a closure plate secured to the beam by a fastening means such as a threaded nut fastener.

In this way, a substantial proportion of the loads which would otherwise be carried by the steering shaft and casing can be transferred to the beam and the steering shaft can then be designed purely to optimize the other requirements placed upon it.

The steering column is adjustable and allows for height and reach adjustments for the steering wheel.

BRIEF DESCRIPTION OF THE DRAWINGS

The invention will now be further described, by way of example, with reference to the accompanying drawings, in which.

DETAILED DESCRIPTION OF THE PREFERRED EMBODIMENT

Figure 1:
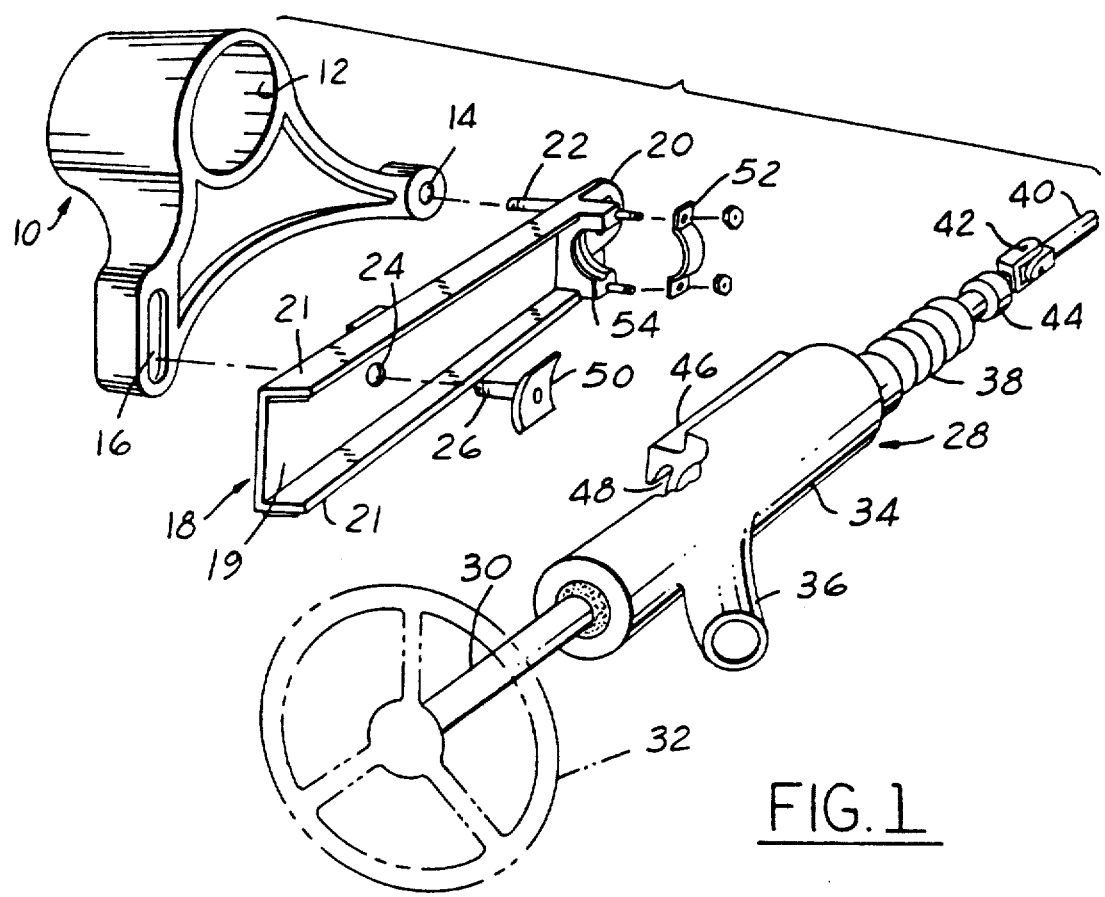
FIG. 1 is a schematic, exploded perspective view of a steering column assembly in accordance with the invention.

Referring now to the Figures, FIG. 1 shows a steering column assembly 28 comprising a steering shaft 30, a steering wheel 32 (shown in phantom at the top of the shaft) and a steering shaft casing 34. The casing 34 has a housing 36 for a conventional steering lock. Below the casing 34 is an energy absorption feature in the form of a convoluted can 38, and a lower steering link 40 connected to the shaft 30 by a universal joint 42. It should be readily apparent to those skilled in the art that various other types of energy absorption devices may also be utilized in the present invention. A bearing 44 is axially fixed on the lower end of the shaft 30. For convenience of description, the end of the steering column assembly furthest from the driver's position will be termed the lower end and the end nearest to the driver's position will be termed the upper end.

Figure 5:
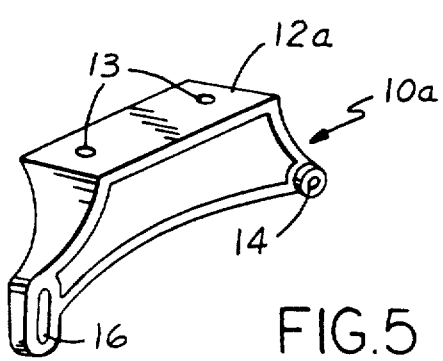
FIG. 5 shows an alternative form of bracket for use in a assembly in accordance with the invention.

As further shown in FIG. 1, a bracket 10 adapted to be secured to the chassis of a vehicle includes a sleeve part 12 fitted over and secured to a tubular cross member (not shown) in the vehicle. The bracket comprises a means for securing a beam 18 to the vehicle structure as will be explained below. Alternative vehicle fittings could be used and FIG. 5 shows an alternative bracket 10a having a generally planar surface 12a and two apertures 13 through which bolts or other fastening means affix bracket 10a to the vehicle chassis. The brackets 10, 10a both have one cylindrical bore 14 and one slotted aperture 16. Alternatively, two spaced mounting points having generally the same configuration as bore 14 and slot 16 could be formed integrally with the vehicle body structure.

A fastening pin 22 is secured to a lower end 20 of a beam 18. The beam 18 has a longitudinal axis generally parallel to the axis of the steering shaft 30, and is adapted to be pivotally mounted to the vehicle chassis as will be described in detail below. Beam 18 includes a generally planar portion 19 including an aperture 24 and two flange portions 21 disposed generally perpendicular to planar portion 19. In the preferred embodiment, beam 18 extends approximately one-half the length of the steering column assembly 28. As will be described below, the steering column assembly 28 slides axially relative to beam 18.

A clamp 52 disposed at the lower end of beam 18 cooperates with a saddle 54 on the beam 18 to clamp the outer race of the bearing 44 of the steering column 28 to the beam. The relative positions of the bearing 44 and the universal joint 42 correspond to those of the saddle 54 and the pin 22 so that when the bearing is clamped in position, one axis of the joint 42 corresponds to the axis of the pin 22.

Fastening pin 22 passes through the bore 14 of bracket 10 and is secured therein so that the beam 18 can pivot about the axis of the pin 22. The amount of possible pivoting movement is determined by means of a second pin or fastener as is shown at 26 passing through the clearance hole 24 in the beam and then through the slotted aperture 16. The pivoting movement will be limited by the fastening pin 26 contacting the top or bottom of the aperture 16. In this manner, the steering shaft 30, the casing 34, and the beam 18 maintain a substantially constant relative orientation to the vehicle body structure.

On one side of the casing 34 of the steering column assembly 28 opposite lock housing 36 and adjacent the beam 18, a guide flange 46 engages the cross section of the beam 18. Guide flange 46 is configured to slide axially in a direction parallel to the longitudinal axis of the beam 18. An internal groove 48 disposed in the guide flange 46 slidably receives a head 50 of the fastener 26.

Figure 2:
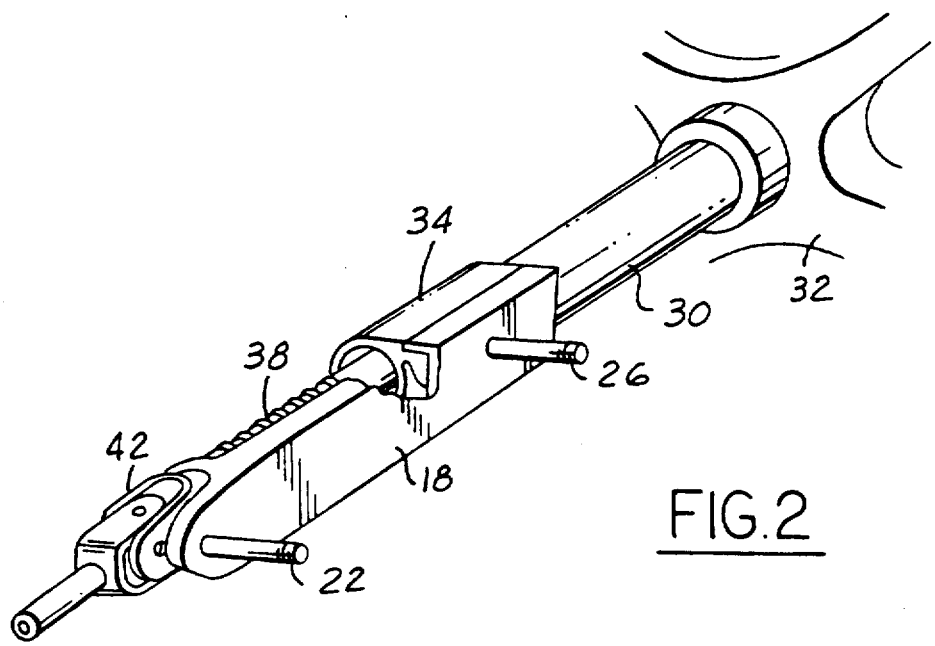
FIG. 2 is a perspective view taken in the opposite direction from FIG. 1 showing the column assembled.

In use, the head 50 of pin fastener 26 is positioned in the slot 48 and the guide flange 46 is laid in a track of the beam 18 defined by planar portion 19 and flange portions 21. The clamp 52 is fastened around the bearing 44 to secure the steering shaft 30 therein. FIG. 2 shows the assembled column ready for mounting in a vehicle to brackets 10 or 10a which are premounted to the vehicle chassis. On the assembly line the pins 22, 26 are inserted through the apertures 14, 16 of brackets 10 or 10a and nuts are tightened on their free ends. The nut on the pin 22 will be tightened such that it continues to allow pivoting movement about the axis of the pin 22, and the tightening of the nut on the pin 26 will be under the control of the vehicle operator, in a manner to be described below. If the tension in the pin 26 is slackened, then (a) the casing 34 can slide axially along the beam 18 in a direction generally parallel to the axis of the beam, (the reach adjustment) and (b) the beam can be rotated up and down in a direction generally perpendicular to the axis of the beam over the distance dictated by the available movement of the pin 26 in the aperture 16 (the height adjustment).

It is to be noted that in altering the height of the column, when the beam pivots about the axis formed at pin 22 and bore 14, the column pivots about the axis of the universal joint 42 because of the coincidence of these two axes as can be seen more clearly in FIG. 2.

Figure 3:
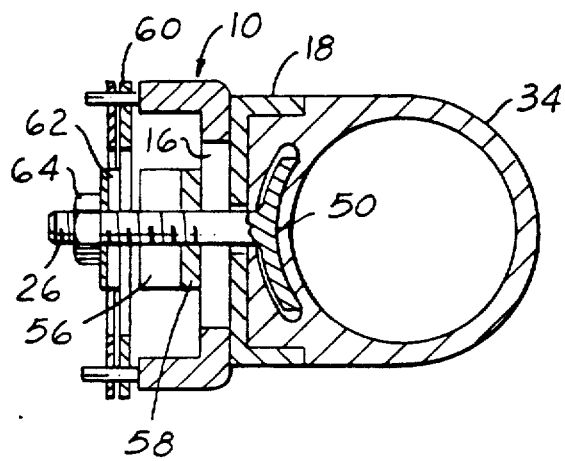
FIG. 3 shows a cross section through one column fastening point.
Figure 4:
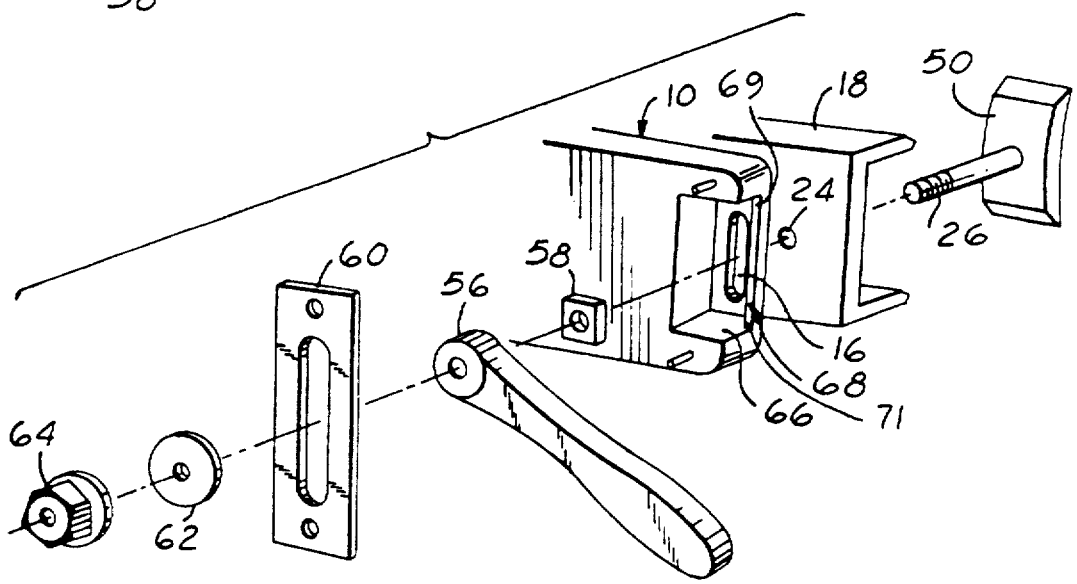
FIG. 4 is an exploded view of the column fastening point shown in FIG. 3.

FIGS. 3 and 4 show the assembly for tightening the pin 26. A lever 56 enables the vehicle operator to tighten or slacken the tension in the pin 26. The lever is interposed between a spacer 58 and a closure Plate 60 which in turn is held in place by a washer 62 and a lock nut 64 threaded onto the end of the Pin 26.

The upper end of the bracket 10 at the aperture 16 includes a recess 66 with a recess wall 68 in the form of a linear cam having an upper end 69 and a lower end 71.

The lower end 71 of wall 68 is separated from the longitudinal plane of the bracket 10 by a greater distance than is the upper end 69 of wall 68. When the components shown in FIG. 4 are all assembled and the nut 64 is tightened on pin 26. radial movement of the lever 56 in an up-and-down direction alters the tension in the pin 26. As the lever 56 rides on the linear cam wall 68. tension on pin 26 is increased as the lever 56 moves from the upper end 69 of wall 68 to the lower end 71 of wall 68 because the lower end 71 of wall 68 has a greater height than the upper end 69 of wall 68. This movement increases the tensile force upon pin 26 so as to lock the position of beam 18 relative to bracket 10 when lever 56 is at the lowermost end 71 of cam wall 68. In operation. when the vehicle operator desires to change the height of the steering column 28. the operator places lever 56 in the uppermost position of cam wall 68 where the pin 26 freely slides with slot 16 of bracket 10. To tightening steering column 28 in the desired location. the operator moves lever 56 to the lowermost position of cam wall 68 at which the pin 26 is pulled tight.

The steering column assembly thus described allows the incorporation of a stiffening beam into the unit so that the stiffening beam can take over many of the functions previously performed by the column itself. In particular the use of the beam in this way can serve to avoid undesirable resonance being produced in the column. Furthermore. the manner in which the column unit can be assembled into the vehicle is considerably simplified compared with prior art assemblies. Various modifications and permutations of the present invention will no doubt be apparent to those skilled in the art. Therefore. it is the following claims. including all equivalents which define the scope of the invention.

I claim:

1. An adjustable steering column mounting assembly for mounting a steering column assembly in an automotive vehicle body structure at two fixed. longitudinally spaced steering column mounting points. the steering column assembly having a steering shaft rotatably mounted in a tubular casing. the mounting assembly comprising:
   a beam having a longitudinal axis generally parallel to the longitudinal axis of said steering shaft and including a clamp disposed at a lower end thereof for clamping an outer race of a bearing fixed to said steering shaft thereto:
   means for securing said beam to said vehicle structure at said two mounting points so that said beam extends between said two mounting points; and
   means for securing said tubular casing to said beam and to said vehicle structure so that casing extends adjacent said beam. said securing means being operative to allow said shaft. said casing and said beam to be adjusted relative to said mounting points and with said shaft. said casing and said beam maintaining a substantially constant relative orientation.

2. A steering column mounting assembly according to claim 1. wherein a first of said two mounting points includes a slotted aperture disposed on said means securing said beam to said vehicle body structure, said first mounting point being operative to allow said beam and said steering shaft secured to said beam a limited amount of movement in a direction generally perpendicular to the longitudinal axis of said beam.

3. A steering column mounting assembly according to claim 2. wherein said first of said two mounting points is further operative to allow said tubular casing to slide axially with respect to said beam in a direction generally parallel to the longitudinal axis of said beam.

4. A steering column mounting assembly according to claim 2. wherein said slotted aperture is adapted to cooperate with a fastener securing said beam to said means securing said beam to said vehicle body structure.

5. A steering column mounting assembly according to claim 4. wherein said beam includes a track operative to engage said tubular casing and to allow said casing to slide axially therein in a direction generally parallel to the longitudinal axis of said steering shaft to adjust the axial length of said steering column assembly.

6. A steering column mounting assembly according to claim 5. wherein said tubular casing includes a guide flange axially disposed thereon. said guide flange being operative to engage said track of said beam and slide axially therein.

7. A steering column mounting assembly according to claim 5. wherein said guide flange of said tubular casing includes a longitudinal groove extending thereon. said groove adapted to receive said fastener therein so that said casing slides axially upon said fastener in a direction generally parallel to the longitudinal axis of said beam.

8. A steering column mounting assembly according to claim 7. wherein said fastener is operative to adjust said steering column assembly in both a direction generally parallel to and a direction generally perpendicular to the longitudinal axis of said steering shaft.

9. A steering column mounting assembly according to claim 1. wherein said beam is operative to pivot on said means securing said beam to said vehicle structure bracket at a position below said clamp. said position coinciding with a universal joint disposed on said steering column assembly and with a second of said two mounting points.

10. A steering column mounting assembly according to claim 1. wherein said means securing said beam to said vehicle body structure comprises a bracket having a slotted aperture defining a first mounting point and a cylindrical bore defining a second mounting point of said two longitudinally spaced mounting points.

11. A steering column mounting assembly according to claim 10. wherein said bracket further includes a generally cylindrical opening adapted to receive a generally cylindrical tube therein for mounting said bracket to said vehicle body structure.

12. A steering column mounting assembly according to claim 10 wherein said bracket further includes a substantially planar surface having at least one fastener receiving aperture therein for securing said surface of said bracket to said vehicle body structure.

13. A steering column mounting assembly according to claim 11. further including means for locking said steering column assembly in a desired position.

14. A steering column mounting assembly according claim 13. wherein said locking means includes a recessed portion disposed at a top end of said beam. said recessed Portion including a linear cam wall having a first end separated a greater distance from the plane of the. beam than is a second end of said cam wall.

15. A steering column mounting assembly according claim 14. wherein said locking means further includes a lever operative to engage said cam wall and said fastener so that movement of said lever from said second end of said cam wall to said first end of said cam wall locks said steering column assembly in said desired position.

16. A steering column mounting assembly according to claim 15, wherein said lever is interposed between a spacer a said beam and a closure plate secured to said beam by a fastener means.

17. An adjustable steering column mounting assembly for mounting a steering column assembly in an automotive vehicle body structure at two fixed, longitudinally spaced steering column mounting points, said steering column assembly having a steering shaft rotatably mounted in a tubular casing, the mounting assembly comprising:

- a beam having a longitudinal axis generally parallel to the longitudinal axis of said steering shaft and including a track operative to engage said tubular casing and to allow said casing to slide axially therein in a direction generally parallel to the longitudinal axis of said steering shaft to adjust the axial length of said steering column assembly;
- a bracket for securing said beam to said vehicle structure at said two mounting points so that said beam extends between said two mounting points, a first of said two mounting points including a slotted aperture disposed on said bracket and being operative to allow said beam and said steering shaft secured to said beam a limited amount of movement in a direction generally perpendicular to the longitudinal axis of said beam and to allow said tubular casing to slide axially with respect to said beam in a direction generally perpendicular to the longitudinal axis of said beam;
- means for securing said tubular casing to said beam and to said vehicle structure so that said casing extends adjacent said beam, said securing means being operative to allow said shaft, said casing and said beam to be adjusted relative to said mounting points and with said shaft, said casing and said beam maintaining a substantially constant relative orientation; and
- means for locking said steering column assembly in a desired position, said means including a recessed portion disposed at a top end of said beam, said recessed portion including a linear cam wall having a first end separated from the plane of the beam at a greater distance than is a second end of said cam wall, said locking means further including a lever operative to engage said cam wall so that movement of said lever from said second end of said cam wall to said first end of said cam wall locks said steering column assembly in said desired position.

* * * * *